United States Patent [19]

Magee

[11] 3,716,600
[45] Feb. 13, 1973

[54] N-ACYL DERIVATIVES OF PHOSPHOROAMIDOTHIOATES

[75] Inventor: Philip S. Magee, San Rafael, Calif.

[73] Assignee: Chevron Research Company, San Francisco, Calif.

[22] Filed: Feb. 24, 1970

[21] Appl. No.: 13,846

Related U.S. Application Data

[63] Continuation-in-part of Ser. No. 810,383, March 25, 1969, abandoned.

[52] U.S. Cl........260/959, 260/294.8 K, 260/326.82, 260/329 P, 260/347.2, 260/402.5, 260/455 P, 260/944, 260/947, 260/948, 260/949, 260/950, 260/951, 260/954, 260/955, 260/956, 260/958, 260/968, 260/984, 424/200, 424/202, 424/203, 424/212
[51] Int. Cl..............................C07f 9/24, A01n 9/36
[58] Field of Search............260/959, 944, 402.5, 956

[56] References Cited

UNITED STATES PATENTS 3,201,446   8/1965   Tolkmith..............................260/959

FOREIGN PATENTS OR APPLICATIONS 253,483   4/1970   U.S.S.R..........................260/455 P

OTHER PUBLICATIONS

Almasi et al., "Chem. Ber.", Vol. 100, pp. 2625-2632 (1967)

*Primary Examiner*—Lewis Gotts
*Assistant Examiner*—Anton H. Sutto
*Attorney*—G. F. Magdeburger, John Stoner, Jr., J. A. Buchanan, Jr. and Raymon Owyang

[57] ABSTRACT

N-acyl derivatives of O-alkyl-S-aliphatic hydrocarbyl phosphoroamidothioates and S-alkyl-S-aliphatic hydrocarbyl phosphoroamidothioates. These compounds are insecticidal.

12 Claims, No Drawings

N-ACYL DERIVATIVES OF PHOSPHOROAMIDOTHIOATES

CROSS-REFERENCE TO RELATED APPLICATION

This application is a continuation-in-part of copending application Serial No. 810,383, filed March 25, 1969, now abandoned.

FIELD OF INVENTION

This invention is directed to O-alkyl-S-aliphatic hydrocarbyl-N-acylphosphoroamidothioates and S-alkyl-S-aliphatic hydrocarbyl-N-acylphosphoroamidodithioates and their use as insecticides.

BACKGROUND OF INVENTION

U.S. Pat. No. 3,309,266 teaches that O-alkyl-S-alkyl phosphoroamidothioates are insecticidal. The phosphoroamidothioates of this patent exhibit both contact and systemic activity against a variety of insects.

Like many of the phosphate insecticides the phosphoroamidothioates of U.S. Pat. No. 3,309,266 are toxic to mammals at fairly low dosages. For instance the $LD_{50}$ oral toxicity of O-methyl-S-methyl phosphoroamidothioate as established by tests on laboratory animals is about 15 mg./kg. This toxicity decreases the commercial potential of the phosphoroamidothioates of U.S. Pat. No. 3,309,266 substantially. It may even preclude their use in certain environments.

DESCRIPTION OF INVENTION

According to this invention it has been generally found that N-acyl derivatives of O-alkyl-S-aliphatic hydrocarbyl phosphoroamidothioates and S-alkyl-S-aliphatic hydrocarbyl phosphoroamidodithioates combine a high degree of insecticidal activity with relatively low mammalian toxicity. This finding is especially surprising since structural modifications which decrease mammalian toxicity normally also decrease insecticidal activity proportionately. This unique combination may permit these novel acylated derivatives to be used to control insects in environments in which the corresponding non-acylated compounds could not be used.

The phosphoroamidothioates of this invention may be represented by the structural formula:

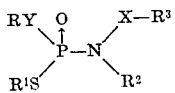

wherein:
R is alkyl of one to three carbon atoms,
$R^1$ is an aliphatic hydrocarbyl radical of one to three carbon atoms,
$R^2$ is hydrogen or alkyl of one to three carbon atoms,
X is carbonyl or sulfonyl,
Y is oxygen or sulfur, and a. when X is carbonyl $R^3$ is hydrogen, alkyl of one to 18 carbon atoms, haloalkyl of one to 18 carbon atoms and one to four halogens of atomic number 9 to 35 (fluorine, chlorine and bromine), alkenyl of two to 18 carbon atoms, alkynyl of three to 18 carbon atoms, cycloalkyl of three to eight carbon atoms, a heterocyclic radical of 1 hetero oxygen, sulfur or nitrogen atom and four to five annular carbon atoms and a total of four to eight carbon atoms, alkoxyalkyl of two to 12 carbon atoms, alkylthioalkyl of two to 12 carbon atoms, alkoxy of one to 12 carbon atoms, alkylthio of one to 12 carbon atoms, phenyl, phenyl substituted with one or two alkyl radicals of one to three carbon atoms, alkoxy radicals of one to three carbon atoms, halogen atoms of atomic number nine to 35 or nitro groups, styryl, phenylalkyl in which the alkyl is of one to three carbon atoms, phenoxyalkyl in which the alkyl is of one to three carbon atoms, thiophenoxyalkyl in which the alkyl is of one to three carbon atoms (as well as phenylalkyl, phenoxyalkyl and thiophenoxyalkyl in which the alkyl is of one to three carbon atoms substituted on the aromatic moiety with halogen atoms of atomic number nine to 35 or nitro groups) or mononitroalkyl of one to three carbon atoms; and b. when X is sulfonyl $R^3$ is alkyl of one to 10 carbon atoms, cycloalkyl of three to eight carbon atoms or phenyl.

$R^1$ will be alkyl, alkenyl or alkynyl. Such aliphatic hydrocarbyl radicals are methyl, ethyl, propyl, allyl and propargyl. If $R^1$ is an unsaturated radical, it will normally have a single terminal olefinic or acetylenic site of unsaturation. The propyl groups represented by R and $R^1$ may be either normal or iso.

$R^2$ will be hydrogen, methyl, ethyl, propyl, isopropyl or cyclopropyl.

The following are illustrative of the radicals represented by $R^3$ when X is carbonyl: Aliphatic and cycloaliphatic: methyl, ethyl, n-propyl, isopropyl, n-butyl, t-butyl, amyl, heptyl, 3-ethylamyl, 2-methylhexyl, n-hexyl, n-octyl, 4-methylheptyl, n-nonyl, n-decyl, 5-ethyloctyl, n-undecyl, n-dodecyl, 8-methyldecyl, n-tridecyl, n-tetradecyl, n-pentadecyl, n-hexadecyl, n-heptadecyl, n-octadecyl, chloromethyl, dichloromethyl, bromomethyl, 2-chloroethyl, 1,2-dichloroethyl, 8,9-dichloropentadecyl, 2-bromo-2-chloroethyl, trifluoromethyl, 3-chloro-propyl, 2,4,6-trichlorohexyl, 3,5-dibromoamyl, 7-chloroheptyl, 3chloro-5,6-dibromoocytly, 2,2-difluoroethyl, 11-bromododecyl, vinyl, propenyl, 3butenyl, 2butenyl, 4-pentenyl, 4-hexenyl, 5-hexenyl, 5-heptenyl, 3-heptenyl, 4-octenyl, 7-octenyl, 5-nonenyl, 4-nonenyl, 7-nonenyl, 9-decenyl, 6-decenyl, 11-dodecenyl, 8-undecenyl, 8-pentadecenyl, 8-heptadecenyl, 5-heptadecenyl, 10-heptadecenyl, 8,11-heptadecyldieneyl, 8,11,14-heptadecyltrieneyl, propargyl, 8-heptadecinyl, cyclopropyl, cyclobutyl, cyclopentyl, cyclohexyl, cycloheptyl, cyclooctyl, cyclododecyl, methoxymethyl, butoxymethyl, methoxybutyl, ethoxyhexyl, hexoxymethyl, butoxymethyl, methoxybutyl, ethoxyhexyl, hexoxymethyl, methoxyoctyl, octoxyethyl, methylthiomethyl, ethylthiomethyl, methylthiopropyl, ethylthiohexyl, hexylthiohexyl, methoxy, propoxy, pentoxy, decanoxy, dodecanoxy, methylthio, hexylthio, nonylthio, dodecylthio, nitromethyl, 2-nitroethyl and 3-nitropropyl.

Aromatic: 3,5-xylyl, p-tolyl, cumyl, 2,4-diethylphenyl, 2-chloro-4-methyl-phenyl, p-fluorophenyl, m- fluorophenyl, p-bromophenyl, 2-fluoro-4-chlorophenyl, 3-methoxyphenyl-2-chloro-4-propylphenyl 4-ethoxyphenyl, o-, m and p-nitrophenyl, 2-chloro-5-nitrophenyl, benzyl, phenylethyl, phenypropyl, phenoxymethyl, phenoxyethyl, phenoxypropyl, thiophenoxymethyl, thiophenoxyethyl, thiophenoxypropyl, 2,4-dinitrophenyl, 3,5-dinitrophenyl.

Heterocyclic: 2-pyridyl, 3-lutidyl, 2-pyrollyl, 2-thienyl, 2-furfuryl, 2-furylvinyl, 3-tetrahydrofurfuryl.

Included among the radicals represented by $R^3$ when X is sulfonyl are: methyl, ethyl, propyl, isopropyl, butyl, sec.-butyl, amyl, hexyl, heptyl, 3-methylhexyl, octyl, nonyl, decyl, cyclo-propyl, cyclobutyl, cyclohexyl, cyclooctyl and phenyl.

Preferred phosphoroamidothioates of this invention are those wherein R and $R^1$ are methyl or ethyl, more preferably methyl, $R^2$ is hydrogen and the organic radicals represented by $R^3$ individually have a maximum of 10 carbon atoms. Particularly preferred are those in which R and $R^1$ are methyl, $R^2$ is hydrogen, X is carbonyl, Y is oxygen, and $R^3$ is alkyl, more preferably straight-chain alkyl, of one to 10 carbon atoms.

Representative compounds of the above formula are: O-methyl-S-methyl-N-formylphosphoroamidothioate, O-methyl-S-methyl-n-acetylphosphoroamidothioate, O-methyl-S-methyl-N-methyl-N-acetylphosphoroamidothioate, O-methyl-S-methyl-N-propionylphosphoroamidothioate, O-methyl-S-methyl-N-butyrylphosphoroamidothioate, O-methyl-S-methyl-N-isobutyrylphosphoroamidothioate, O-methyl-S-methyl-N-pentanoylphosphoroamidothioate, O-methyl-S-methyl-N-hexanoylphosphoroamidothioate, O-methyl-S-methyl-N-heptanoylphosphoroamidothioate, O-methyl-S-methyl-N-methyl-N-octanoylphosphoroamidothioate, O-methyl-S-methyl-N-decanoylphosphoroamidothiate, O-methyl-S-methyl-N-dodecanoylphosphoroamidothioate, O-methyl-S-methyl-N-chloroacetylphosphoroamidothioate, O-methyl-S-methyl-N-bromoacetylphosphoroamidothioate, O-methyl-S-methyl-N-3-chlorobutyrylphosphoroamidothioate, O-methyl-S-methyl-N-3-bromopropionylphosphoroamidothioate, O-methyl-S-methyl-N-3,3-dichloropropionylphosphoroamidothioate, O-methyl-S-methyl-N-methyl-N-dichloroacetylphosphoroamidothioate, O-methyl-S-methyl- N-trifluoroacetylphosphoroamidothioate, O-methyl-S-methyl-N-2,3,4-trichloropentanoylphosphoroamidothioate, O-methyl-S-methyl-N-3,4-dichlorobutyrylphosphoroamidothioate, O-methyl-S-methyl-N-3,3-difluoropropionylphosphoroamidothioate, O-methyl-S-methyl-N-fluoroacetylphosphoroamidothioate, O-methyl-S-methyl-N-7-bromoheptanoylphosphoroamidothioate, O-methyl-S-methyl-N-methyl-N-6,6-dibromohexanoylphosphoroamidothioate, O-methyl-S-methyl-N-2,4-dichloro-6-bromohexanoylphosphoroamidothioate, O-methyl-S-methyl-N-8-chlorooctanoylphosphoroamidothioate, O-methyl-S-methyl-N-2,6-dibromooctanoylphosphoroamidothioate, O-methyl-S-methyl-N-12-chlorododecanoylphosphoroamidothioate, O-methyl-S-methyl-acrylylphosphoroamidothioate, O-methyl-S-methyl-N-3-butenoylphosphoroamidothioate, O-methyl-S-methyl-N-isobutenoylphosphoroamidothioate, O-methyl-S-methyl-N-methyl-N-3-pentenoylphosphoroamidothioate, O-methyl-S-methyl-N-4-pentenoylphosphoroamidothioate, O-methyl-S-methyl-N-6-heptenoylphosphoroamidothioate, O-methyl-S-methyl-N-7-octenoylphosphoroamidothioate, O-methyl-S-methyl-N-11-dodecenoylphosphoroamidothioate, O-methyl-S-methyl-N-cyclopropanoylphosphoroamidothioate, O-methyl-S-methyl-N-methyl-N-cyclohexanoylphosphoroamidothioate, O-methyl-S-methyl-N-cyclohexanoylphosphoroamidothioate, O-methyl-S-methyl-N-cyclooctanoylphosphoroamidothioate.

O-methyl-S-methyl-N-3-pyridylcarbonylphosphoroamidothioate, O-methyl-S-methyl-N-2-lutidylcarbonylphosphoroamidothioate, O-methyl-S-methyl-N-3-pyrollylcarbonylphosphoroamidothioate, O-methyl-S-methyl-N-2-thienylcarbonylphosphoroamidothioate, O-methyl-S-methyl-N-2-furoylphosphoroamidothioate, O-methyl-S-methyl-N-2-furylacrytoylphosphoroamidothioate.

O-methyl-S-methyl-N-2-methoxyacetylphosphoroamidothioate, O-methyl-S-methyl-N-2-pentoxyacetylphosphoroamidothioate, O-methyl-S-methyl-N-3-methoxypropionylphosphoromaidothioate, O-methyl-S-methyl-N-4-ethoxybutyrylphosphoroamidothioate, O-methyl-S-methyl-N-2-hexoxyacetylphosphoromaidothioate, O-methyl-S-methyl-N-4-propoxybutyrylphosphoroamidothioate, O-methyl-S-methyl-N-5-pentoxypentanoylphosphoroamidothioate, O-methyl-S-methyl-N-8-methoxyoctanoylphosphoroamidothioate, O-methyl-S-methyl-N-10-methoxyundecanoylphosphoroamidothioate, O-methyl-S-methyl-N-8-butoxyoctanoylphosphoroamidothioate, O-methyl-S-methyl-N-2-methylthioacetylphosphoroamidothioate, O-methyl-S-methyl-N-2-hexylthioacetylphosphoroamidothioate, O-methyl-S-methyl-N-3-butylthiopropionylphosphoroamidothioate, O-methyl-S-methyl-N-5-methylthiopentanoylphosphoroamidothioate, O-methyl-S-methyl-N-6-methylthiooctanoylphosphoroamidothioate, O-methyl-S-methyl-N-11-methylthioundecanoylphosphoroamidothioate.

O-methyl-S-methyl-N-methoxycarbonylphosphoroamidothioate, O-methyl-S-methyl-N-isopropoxycarbonylphosphoroamidothioate, O-methyl-S-methyl-N-pentanoxycarbonylphosphoroamidothioate, O-methyl-S-methyl-N-hexanoxycarbonylphosphoroamidothioate, O-methyl-S-methyl-N-hexanoxycarbonylphosphoroamidothioate, O-methyl-S-methyl-N-octanoxycarbonylphosphoroamidothioate, O-methyl-S-methyl-N-dodecanoxycarbonylphosphoroamidothioate, O-methyl-S-methyl-N-methylthiocarbonylphosphoroamidothioate, O-methyl-S-methyl-N-propylthiocarbonylphosphoroamidothioate, O-methyl-S-methyl-N-hexylthiocarbonylphosphoroamidothioate, O-methyl-S-methyl-N-octylthiocarbonylphosphoroamidothioate, O-methyl-S-methyl-N-dodecylthiocarbonylphosphoroamidothioate.

O-methyl-S-methyl-N-benzoylphosphoroamidothioate, O-methyl-S-methyl-N-4-toluoylphosphoroamidothioate, O-methyl-S- methyl-N-3,5-dimethylbenzoylphosphoroamidothioate, O-methyl-S-methyl-N-4-isopropylbenzoylphosphoroamidothioate, O-methyl-S-methyl-N-4-chlorobenzoylphosphoroamidothioate, O-methyl-S-methyl-N-2,4-dichlorobenzoylphosphoroamidothioate, O-methyl-S-methyl-N-2-phenylacetylphosphoroamidothioate, O-methyl-S-methyl-N-3-phenylpropionylphosphoroamidothioate, O-methyl-S-methyl-N-3-fluorobenzoylphosphoroamidothioate, O-methyl-S-methyl-N-2-phenoxyacetylphosphoroamidothioate, O-methyl-S-methyl-N-3-phenoxypropionylphosphoroamidothioate, O-methyl-S-methyl-2-phenylthioacetylphosphoroamidothioate, O-methyl-S-methyl-N-3-nitropropionylphosphoroamidothioate, O-methyl-S-methyl-N-2-phenylthiopropionylphosphoroamidothioate, O-methyl-S-methyl-N-4-nitrobutynylphosphoroamidothioate, O-methyl-S-methyl-N-2,4-dinitrobenzoylphosphoroamidothioate.

O-ethyl-S-methyl-N-acetylphosphoroamidothioate, O-isopropyl-S-methyl-N-acetylphosphoroamidothioate, methyl-N 2-chloro-4bromobutyrylphosphoroamidothioate, O-propyl-S-methyl-N-isopropionylphosphoroamidothioate, O-methyl-S-ethyl-N-acetylphosophoroamidothioate, O-methyl-S-ethyl-N-dichloroacetylphosphoroamidothioate, O-ethyl-S-ethyl-N-4-bromobutyrylphosphoroamidothioate, O-ethyl-S-ethyl-N-formylphosphoroamidothioate, O-ethyl-S-ethyl-N-acetylphosphoroamidothioate, O-ethyl-S-ethyl-N-3-chloropropionylphosphoroamidothioate, O-ethyl-S-ethyl-N-3,4-dibromobutyrylphosphoroamidothioate, O-ethyl-S-ethyl-N-hexanoylphosphoroamidothioate, O-ethyl-S-ethyl-N-decanoylphosphoroamidothioate, O-ethyl-S-ethyl-N-dodecanoylphosphoroamidothioate, O-ethyl-S-ethyl-N-trifluoroacetylphosphoroamidothioate, O-ethyl-S-ethyl-N-acrylphosphoroamidothioate, O-ethyl-S-ethyl-N-5-hexenyl-phosphoroamidothioate, O-ethyl-S-ethyl-N-8-nonenoylphosphoroamidothioate, O-ethyl-S-ethyl-N-11-dodecenoylphosphoroamidothioate, O-ethyl-S-ethyl-N-cyclopropanoylphosphoroamidothioate, O-ethyl-S-ethyl-N-cyclohexanoylphosphoroamidothioate, O-ethyl-S-ethyl-N-cyclooctanoylphosphoroamidothioate, O-ethyl-S-ethyl-N-2-pyridylcarbonylphosphoroamidothioate, O-ethyl-S-ethyl-N-3-thienoylphosphoroamidothioate, O-ethyl-S-ethyl-N-3-tetrahydrofurfurylcarbonylphosphoramidothioate, O-ethyl-S-ethyl-N-2-methoxyacetylphosphoroamidothioate, O-ethyl-S-ethyl-N-3-butoxypropionylphosphoramidothioate, O-ethyl-S-ethyl-N-10-methoxydecanoylphosphoroamidothioate, O-ethyl-S-ethyl-N-2-methylthioacetylphosphoroamidothioate, O-ethyl-S-ethyl-N-4-methylthiobutyrylphosphoroamidothioate, O-ethyl-S-ethyl-N-7-methylthioheptanoylphosphoroamidothioate, O-ethyl-S-ethyl-N-2-octylthioacetylphosphoroamidothioate, O-ethyl-S-ethyl-N-6-hexylthiohexanoylphosphoroamidothioate, O-ethyl-S-ethyl-N-methoxycarbonylphosphoramidothioate, O-ethyl-S-ethyl-N-methoxycarbonylphosphoroamidothioate, O-ethyl-S-ethyl-N-pentoxycarbonylphosphoroamidothioate, O-ethyl-S-ethyl-N-dodecoxycarbonylphosphoroamidothioate, O-ethyl-S-ethyl-N-methylthiocarbonylphosphoroamidothioate, O-ethyl-S-ethyl-N-hexylthiocarbonylphosphoroamidothioate, dodecylthiocarbonylphosphoroamidothioate, O-ethyl-S-ethyl-N-benzoylphosphoroamidothioate, O-ethyl-S-ethyl-N-2-methyl-4-chlorobenzoylphosphoroamidothioate, O-ethyl-S-ethyl-N-4-propylbenzoylphosphoroamidothioate, O-ethyl-S-ethyl-N-2,4-dinitrobenzoylphosphoroamidothioate, O-ethyl-S-ethyl-N-4-chlorobenzoylphosphoroamidothioate, O-ethyl-S-ethyl-N-3-phenylpropionylphosphoroamidothioate, O-propyl-S-ethyl-N-acetylphosphoroamidothioate, O-isopropyl-S-ethyl-N-acetylphosphoroamidothioate, O-propyl-S-ethyl-N-butyrylphosphoroamidothioate, O-methyl-S-propyl-N-isobutyrylphosphoroamidothioate, O-methyl-S-propyl-N-acetylphosphoroamidothioate, O-methyl-S-isopropyl-N-dibromoacetylphosphoroamidothioate, O-methyl-S-propyl-N-4-chlorobutyrylphosphoroamidothioate, O-ethyl-S-propyl-N-2,3-dichloropropionylphosphoroamidothioate, O-ethyl-S-isopropyl-N-acetylphosphoroamidothioate, O-propyl-S-propyl-N-formylphosphoroamidothioate, O-propyl-S-propyl-N-acetylphosphoroamidothioate, O-propyl-S-propyl-N-butyrylphosphoroamidothioate, O-propyl-S-propyl-N-3-chlorobutyrylphosphoroamidothioate, O-propyl-S-propyl-N-2,3-dibromopropionylphosphoroamidothioate, O-propyl-S-propyl-N-dichloroacetylphosphoroamidothioate, O-isopropyl-S-propyl-N-acetylphosphoroamidothioate, O-ethyl-S-allyl-N-2,3-dibromopropionylphosphoroamidothioate, O-ethyl-S-allyl-N-chloroacetylphosphoroamidothioate, O-methyl-S-allyl-N-acetylphosphoroamidothioate, O-methyl-S-allyl-N-butyrylphosphoroamidothioate, O-isopropyl-S-allyl-N-acetylphosphoroamidothioate, O-ethyl-S-propargyl-N-propionylphosphoroamidothioate and O-propyl-S-propargyl-N-2-chlorobutyrylphosphoroamidothioate.

O-methyl-S-methyl-N-methanesulfonylphosphoroamidothioate, O-methyl-S-methyl-N-propanesulfonylphosphoroamidothioate, O-methyl-S-methyl-N-hexanesulfonylphosphoroamidothioate, O-methyl-S-methyl-N-octanesulfonylphosphoroamidothioate, O-methyl-S-methyl-N-dodecanesulfonylphosphoroamidothioate, O-methyl-S-methyl-N-benzenesulfonylphosphoroamidothioate, O-methyl-S-methyl-N-cyclohexanesulfonylphosphoroamidothioate, O-methyl-S-methyl-N-cyclopropanesulfonylphosphoroamidothioate, O-ethyl-N-methanesulfonylphosphoroamidothioate, O-ethyl-S-ethyl-N-hexanesulfonylphosphoroamidothioate, O-ethyl-S-ethyl-N-dodecanesulfonylphosphoroamidothioate, O-ethyl-S-ethyl-N-cyclooctanesulfonylphosphoroamidothioate, O-ethyl-S-ethyl-N-benzenesulfonylphosphoroamidothioate, O-propyl-S-propyl-N-methanesulfonylphosphoroamidothioate, O-propyl-S-propyl-N-hexanesulfonylphosphoroamidothioate, O-propyl-S-propyl-N-dodecanesulfonylphosphoroamidothioate, O-propyl-S-propyl-N-cyclooctanesulfonylphosphoroamidothioate, O-propyl-S-propyl-N-benzenesulfonylphosphoroamidothioate, O-methyl-S-allyl-N- methanesulfonylphosphoroamidothioate, O-methyl-S-allyl-Nyhexanesulfonylphosphoroamidothioate, O-methyl-S-allyl-N-dodecanesulfonylphosphoroamidothioate, O-methyl-S-allyl-N-cyclooctanesulfonyl-phosphoroamidothioate, O-methyl-S-allyl-N-benzenesulfonylphosphoroamidothioate, O-methyl-S-propargyl-N-methanesulfonylphosphoroamidothioate, O-methyl-S-propargyl-N-hexanesulfonylphosphoroamidothioate, O-methyl-S-propargyl-N-dodecanesulfonylphosphoroamidothioate, O-methyl-S-propargyl-N-cyclooctanesulfonylphosphoroamidothiate and O-methyl-S-propargyl-N-benzenesulfonylphosphoroamidothioate.

Other representative compounds of the above formula are: S,S-dimethyl-N-formylphosphoroamidodithioate, S,S-dimethyl-N-acetylphosphoroamidodithioate, S,S-dimethyl-N-methyl-N-acetylphosphoroamidodithioate, S,S-dimethyl-N-propionylphosphoroamidodithioate, S,S-dimethyl-N-butyrylphosphoroamidodithioate, S,S-dimethyl-N-isobutyrylphosphoroamidodithioate, S,S-dimethyl-N-pentanoylphosphoroamidodithioate, S,S-dimethyl-N-hexanoylphosphoroamidodithioate, S,S-dimethyl-N-heptanoylphosphoroamidodithioate, S,S-dimethyl-N-octanoylphosphoroamidodithioate, S,S-dimethyl-N-decanoylphosphoroamidodithioate, S,S-dimethyl-N-dodecanoylphosphoroamidodithioate, S,S-dimethyl-N-chloroacetylphosphoroamidodithioate, S,S-dimethyl-N-bromoacetylphosphoroamidodithioate, S,S-dimethyl-N-3-chlorobutyrylphosphoroamidodithioate, S,S-dimethyl-N-3-bromopropionylphosphoroamidodithioate, S,S-dimethyl-N-3,3-dichloropropionylphosphoroamidodithioate, S,S-dimethyl-N-trifluoroacetylphosphoroamidodithioate, S,S-dimethyl-N-2,3,4-trichloropentanoylphosphoroamidodithioate, S,S-dimethyl-N-3,4-dichlorobutyrylphosphoroamidodithioate, S,S-dimethyl-N-3,3-difluoropropionylphosphoroamidodithioate, S,S-dimethyl-N-fluoroacetylphosphoroamidodithioate, S,S-dimethyl-N-7-bromoheptanoylphosphoroamidodithioate, S,S-dimethyl-N-methyl-N-6,6-dibromohexanoylphosphoroamidodithioate, S,S-dimethyl-N-2,4-dichloro-6-bromohexanoylphosphoroamidodithioate, S,S-dimethyl-N-8-chlorooctanoylphosphoroamidodithioate, S,S-dimethyl-N-2,6-dibromooctanoylphosphoroamidodithioate, S,S-dimethyl-N-12-chlorododecanoylphosphoroamidodithioate, S,S-dimethylacrylylphosphoroamidodithioate, S,S-dimethyl-N-3-butenoylphosphoroamidodithioate, S,S-dimethyl-N-isobutenoylphosphoroamidodithioate, S,S-dimethyl-N-methyl-N-3-pentenoylphosphoroamidodithioate, S,S-dimethyl-N-4-pentenoylphosphoroamidodithioate, S,S-dimethyl-N-6-heptenoylphosphoroamidodithioate, S,S-dimethyl-N-7-octenoylphosphoroamidodithioate, S,S-dimethyl-N-1111-dodecenoylphosphoroamidodithioate, S,S-dimethyl-N-cyclopropanoylphosphoroamidodithioate, S,S-dimethyl-N-methyl-N-cyclohexanoylphosphoroamidodithioate, S,S-dimethyl-N-cyclohexanoylphosphoroamidodithioate, S,S-dimethyl-N-cyclooctanoylphosphoroamidodithioate.

S,S-dimethyl-N-3-pyridylcarbonylphosphoroamidodithioate, S,S-dimethyl-N-2-lutidylcarbonylphosphoroamidodithioate, S,S-dimethyl-N-3-pyrollylcarbonylphosphoroamidodithioate, S,S-dimethyl-N-2-thienylcarbonylphosphoroamidodithioate, S,S-dimethyl-N-2-furoylphosphoroamidodithioate, S,S-dimethyl-N-2-furylacryloylphosphoroamidodithioate.

S,S-dimethyl-N-2-methoxyacetylphosphoroamidodithioate, S,S-dimethyl-N-2-pentoxyacetylphosphoroamidodithioate, S,S-dimethyl-N-3-methoxypropionylphosphoroamidodithioate, S,S-dimethyl-N4-ethoxybutyrylphosphoroamidodithioate, S,S-dimethyl-N-2-hexoxyacetylphosphoroamidodithioate, S,S-dimethyl-N-4-propoxybutyrylphosphoroamidodithioate, S,S-dimethyl-N-5-pentoxypentanoylphosphoroamidodithioate, S,S-dimethyl-N-8-methoxyoctanoylphosphoroamidodithioate, S,S-dimethyl-N-10-methoxyundecanoylphosphoroamidodithioate, S,S-dimethyl-N-8-butoxyoctanoylphosphoroamidodithioate, S,S-dimethyl-N-2-methylthioacetylphosphoroamidodithioate, S,S-dimethyl-N-2-hexylthioacetylphosphoroamidodithioate, S,S-dimethyl-N-3-butylthiopropionylphosphoroamidodithioate, S,S-dimethyl-N-5-methylthiopentanoylphosphoroamidodithioate, S,S-dimethyl-N-6-methylthiooctanoylphosphoroamidodithioate, S,S-dimethyl-N-11-methylthioundecanoylphosphoroamidodithioate.

S,S-dimethyl-N-methoxycarbonylphosphoroamidodithioate, S,S-dimethyl-N-isopropoxycarbonylphosphoroamidodithioate, S,S-dimethyl-N-pentanoxycarbonylphosphoroamidodithioate, S,S-dimethyl-N-hexanoxycarbonylphosphoroamidodithioate, S,S-dimethyl-N-octanoxycarbonylphosphoroamidodithioate, S,S-dimethyl-N-dodecanoxycarbonylphosphoroamidodithioate, S,S-dimethyl-N-methylthiocarbonylphosphoroamidodithioate, S,S-dimethyl-N-propylthiocarbonylphosphoroamidodithioate, S,S-dimethyl-N-hexylthiocarbonylphosphoroamidodithioate, S,S-dimethyl-N-octylthiocarbonylphosphoroamidodithioate, S,S-dimethyl-N-dodecylthiocarbonylphosphoroamidodithioate, S,S-dimethyl-N-benzoylphosphoroamidodithioate, S,S-dimethyl-N-4-toluoylphosphoroamidodithioate, S,S-dimethyl-N-3,5-dimethylbenzoylphosphoroamidodithioate, S,S-dimethyl-N-4-isopropylbenzoylphosphoroamidodithioate, S,S-dimethyl-N-4-chlorobenzoylphosphoroamidodithioate, S,S-dimethyl-N-2,4-dichlorobenzoylphosphoroamidodithioate, S,S-dimethyl-N-2-phenylacetylphosphoroamidodithioate, S,S-dimethyl-N-3-phenylpropionylphosphoroamidodithioate, S,S-dimethyl-N-3-fluorobenzoylphosphoroamidodithioate, S,S-dimethyl-N-2-phenoxyacetylphosphoroamidodithioate, S,S-dimethyl-N-3-phenoxypropionylphosphoroamidodithioate, S,S-dimethyl-2-phenylthioacetylphosphoroamidodithioate, S,S-dimethyl-N-3-nitropropionylphosphoroamidodithioate, S,S-dimethyl-N-2-phenylthiopropionylphosphoroamidodithioate, S,S-dimethyl-N-4- nitrobutynylphosphoroamidodithioate, S,S-dimethyl-N-2,4-dinitrobenzoylphosphoroamidodithioate.

S-ethyl-S-methyl-N-acetylphosphoroamidodithioate, S-isopropyl-S-methyl-N-acetylphosphoroamidodithioate, S-ethyl-S-methyl-N-isopropionylphosphoroamidodithioate, S,S-diethyl-N-formylphosphoroamidodithioate, S,S-diethyl-N-3,4-dibromobutyrylphosphoroamidodithioate, S,S-diethyl-N-dodecanoylphosphoroamidodithioate, S,S-diethyl-N-acrylphosphoroamidodithioate, S,S-diethyl-N-8-nonenoylphosphoroamidodithioate, S,S-diethyl-N-cyclohexanoylphosphoroamidodithioate, S,S-diethyl-N-3-thienoylphosphoroamidodithioate, S,S-diethyl-N-3-butoxypropionylphosphoroamidodithioate, S,S-ethyl-N-7-methylthioheptanoylphosphoroamidodithioate, S,S-diethyl-N-methoxycarbonylphosphoroamidodithioate, S,S-diethyl-N-dodecylthiocarbonylphosphoroamidodithioate, S,S-diethyl-N-4-propylbenzoylphosphoroamidodithioate, S,S-diethyl-N-3-phenylpropionylphosphoroamidodithioate, S-methyl-S-propyl-N-isobutyrylphosphoroamidodithioate, S-methyl-S-propyl-N-4-chlorobutyrylphosphoroamidodithioate, S-ethyl-S-propyl-N-2,3-dichloropropionylphosphoroamidodithioate.

S,S-dipropyl-N-formylphosphoroamidodithioate, S,S-dipropyl-N-2,3-dibromopropionylphosphoroamidodithioate, S-isopropyl-S-propyl-N-acetylphosphoroamidodithioate, S-methyl-S-allyl-N-acetylphosphoroamidodithioate, S-ethyl-S-propargyl-N-propionylphosphoroamidodithioate.

S,S-dimethyl-N-methanesulfonylphosphoroamidodithioate, S,S-dimethyl-N-octanesulfonylphosphoroamidodithioate, S,S-dimethyl-N-cyclohexanesulfonylphosphoroamidodithioate, S,S-diethyl-N-hexanesulfonylphosphoroamidodithioate, S,S-diethyl-N-hexanesulfonylphosphoroamidodithioate S,S-diethyl-N-benzenesulfonylphosphoroamidodithioate, S,S-dipropyl-N-dodecanesulfonylphosphoroamidodithioate, S-methyl-S-allyl-N-methanesulfonylphosphoroamidodithioate, S-methyl-S-allyl-N-cyclooctanesulfonylphosphoroamidodithioate, S-methyl-S-propargyl-N-hexanesulfonylphosphoroamidodithioate and S-methyl-S-propargyl-N-benzenesulfonylphosphoroamidodithioate.

O-alkyl-S-aliphatic hydrocarbyl-N-acylphosphoroamidothioates and S-alkyl-S-aliphatic hydrocarbyl-N-acylphosphoroamidodithioates of the above formula may be prepared by acylating (which includes sulfonylating) an appropriate O-alkyl-S-aliphatic hydrocarbyl phosphoroamidothioate or S-alkyl-S-aliphatic hydrocarbyl phosphoroamidodithioate. This technique is especially applicable to the N-alkanoyl compounds in which the alkyl group of the alkanoyl radical of of 1 to 4 carbon atoms. As indicated previously, O-alkyl-S-alkyl phosphoroamidothioates and their preparation are disclosed in U.S. Pat. No. 3,309,266. O-alkyl-S-unsaturated aliphatic hydrocarbyl phosphoroamidothioates and their preparation are disclosed in copending application Ser. No. 486,233, filed Sept. 9, 1965, the disclosure of which is hereby incorporated by reference.

Conventional acylating agents, such as acyl halides, ketenes and acid anhydrides and conventional acylating conditions may be used in this reaction. In the case of the N-alkanoyl compounds alkanoyl chlorides are preferred acylating agents.

This acylation reaction (illustrated with an acyl halide as the acylating agent) may be represented by the following equation:

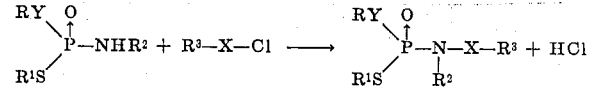

This acylation will usually be carried out at about 0° to 60° C. in the presence of solvents such as methylene chloride, chloroform, tetrahydrofuran and benzene. Pressure is not critical in this reaction. For convenience, atmospheric or autogenous pressure will be used. Under normal conditions, stoichiometric proportions or a slight deficiency of acylating agent will be used. The acylation will usually take 2 to 24 hours to reach completion. The reaction product may be purified by conventional extraction and recrystallization techniques.

N-acylated phosphoroamidothioates of this invention may also be prepared by acylating an appropriate O,O-dialkyl phosphoroamidothionate and then reacting the resulting N-acyl phosphoroamidothionate with an alkylating (*alkylating is used generically and is intended to include agents which are used to incorporate alkenyl and alkynyl groups.) agent to produce the O-alkyl-S-aliphatic hydrocarbyl-N-acylphosphoroamidothioate. This reaction scheme is represented (using an acyl chloride as the acylating agent) by the following equation:

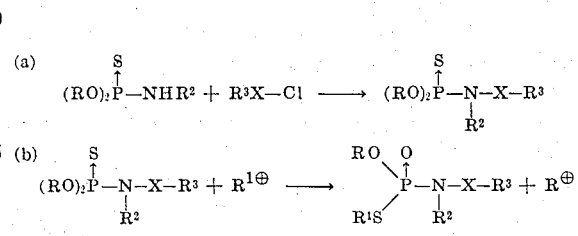

This acylation may be carried out by the same techniques described above for acylating O-alkyl-S-aliphatic hydrocarbyl phosphoroamidothioates. The reaction between the N-acylphosphoroamidothionate and the alkylating agent may be done according to the procedures described in U.S. Pat. No. 3,309,266 for reacting O,O-dialkyl phosphoroamidothionate with an alkylating agent. In the case of the preferred compounds of this invention (i.e., R and $R^1$ are methyl and $R^2$ is hydrogen) dimethyl sulfate is the preferred alkylating agent.

If the acylating agent, e.g. $R^3$—X—Cl, is weak it may be desirable to prepare the compounds of this invention by amidating an appropriate O,O-dialkyl phosphorothiochloridate to obtain O,O-dialkyl-N-acylphosphoroamidothioate and reacting said N-acyl phosphoroamidothioate with an alkylating agent as describe above. This reaction scheme is illustrated by the following set of equations:

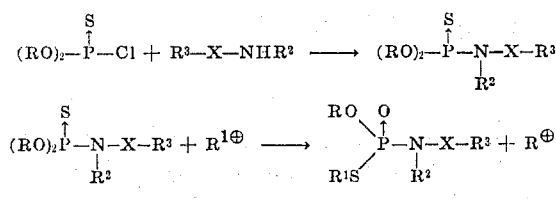

The S-alkyl-S-aliphatic hydrocarbyl phosphoroamidodithioate can be prepared by the reaction of phosphorous oxychloride with a mercaptan followed by amidation of the resulting S-alkyl-S-aliphatic hydrocarbyl phosphoroamidodithioate. The first step of the synthesis involves the addition of 2 moles of a mercaptan to 1 mole of phosphorous oxychloride ($POCl_3$) according to the following equations (if R and $R^1$ are the same, a single reaction can be carried out):

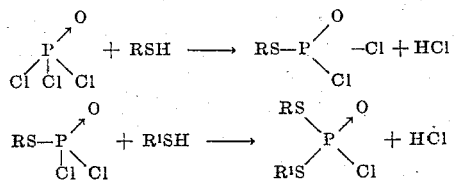

The above reactions are preferably carried out in the presence of a weak base, such as the organic amines, for example pyridine, dimethyl aniline, triethyl amine, etc. The base is preferably present in an amount at least equal to the moles of mercaptan. An inert organic solvent, such as diethyl ether, tetrahydrofuran, dioxane, dichloromethane, etc. may be present. The reaction temperatures are generally in the range of 0° to 15° C., preferably 0° to 5° C. The reaction time necessary to complete the addition of the mercaptan to the phosphorous oxychloride will range from about 1 to 10 hours. The S-alkyl-S-aliphatic hydrocarbyl phosphorochloridodithioate product can be purified by distillation, crystallization or chromatography, if desired.

The second step of the preparation, i.e. amidation, is carried out by adding gaseous ammonia to a solution of the S-alkyl-S-aliphatic hydrocarbyl phosphorochloridodithioate according to the following equation:

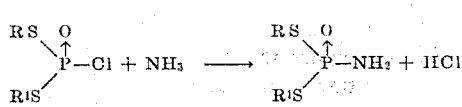

The reaction is preferably carried out in an inert organic solvent, such as benzene, toluene, xylene and the like, at temperatures in the range of 10° to 75° C., preferably 40° to 60° C. Completion of the reaction is indicated by cessation of ammonium chloride precipitation. Following the reaction, the crude product can be isolated by filtration and then separated from ammonium chloride by selective extraction with a solvent, such as acetone, methanol of similar organic materials.

EXAMPLES

The following examples describe methods which may be used to prepare the phosphoroamidothioates of this invention. These examples are not intended to limit the invention described herein. Percentages are by weight unless otherwise indicated.

EXAMPLE 1

14.1 g. (0.1 mole) of O-methyl-S-methylphosphoroamidothioate was dissolved in 100 ml. benzene in a flask. 7.85 g. (0.1 mole) acetylchloride was added to this solution. This mixture was brought to reflux — HCl being evolved at that point. This mixture was then stirred overnight at ambient temperature. Supernatant liquid was decanted and the solvent was stripped off at 30°–40° C., 12 mm. Hg. An oil remained which solidified on standing. This solid was filtered and washed with ether to yield 7 g. of impure O-methyl-S-methyl-N-acetylphosphoroamidothioate. This material melted at 64–68°A C. and had the following analysis:

|     | Calculated | Found |
| --- | --- | --- |
| % P | 16.93 | 18.28 |
| % S | 17.48 | 18.05 |

EXAMPLE 2

176 g. (1.25 moles) of O-methyl-S-methyl phosphoroamidothionate was dissolved in 300 ml. of dichloromethane and charged to a 1 liter flask. 98 g. (1.25 moles) of acetylchloride dissolved in 100 ml. of dichloromethane was added. The solution was stirred, warmed to 33° C., held at that temperature for 4 hours, then and additional 98 g. (1.25 moles) of acetylchloride was added. The mixture was held at room temperature for 18 hours and then added to 500 ml. of ice water. The phases were separated and the aqueous phase was extracted with 4 200 ml. portions of dichloromethane. The extracts were combined with the separated organic phase and the solvent removed by gentle heating under vacuum to give 50 g. of product. The aqueous phase after batch extraction was further extracted continuously for 18 hours in a liquid-liquid extraction apparatus using 2 liters of dichloromethane as the extractant. Evaporation of the dichloromethane gave an additional 110 g. of product, giving a total yield of 87 percent. Upon purification, the product, O-methyl-S-methyl-N-acetylphosphoroamidothioate, gave the following analysis:

|     | Calculated | Found |
| --- | --- | --- |
| % N | 7.65 | 7.28 |
| % S | 17.48 | 17.88 |

EXAMPLE 3

6 g. of O,O-diethyl-N-acetylphosphoroamidothionate was mixed with 10 ml. ethyl iodide in a flask. This mixture was refluxed for 30 hours. The resulting reaction mixture was stripped at 80°C., 30 mm. Hg leaving 4.5 g. oil which crystallized on standing. This material, O-ethyl-S-ethyl-N-acetylphosphoroamidothioate, had the following analysis:

|     | Calculated | Found |
|-----|------------|-------|
| % P | 14.68      | 14.02 |
| % S | 15.19      | 15.15 |

EXAMPLE 4

30 g. of O,O-dimethylphosphoroamidothioate and 41 g. of n-decanoyl chloride were dissolved in 120 ml. of methylene chloride and refluxed for 2 hours. After treatment with water to remove acidic by-products, the solution was dried over magnesium sulfate and stripped to give 60.4 g. of O,O-dimethyl-N-decanoyl phosphoroamidothioate (96 percent yield).

20 g. of the above O,O-dimethyl-N-decanoyl phosphoroamidothioate was then mixed with 4 g. dimethyl sulfate and held at 60°C. for 1 hour. O-methyl-S-methyl-N-decanoyl phosphoroamidothioate was recovered by chromatographic means giving a yield of 9.5 g. This material had the following analysis:

|     | Calculated | Found |
|-----|------------|-------|
| % P | 10.50      | 10.67 |
| % S | 10.85      | 10.47 |

EXAMPLE 5

S,S-dimethyl-N-acetylphosphoroamidodithioate was prepared as follows.

A solution of 73.2 g. (0.48 mole) of phosphorous oxychloride in 300 ml. of dry diethyl ether was charged to a 1 liter flask at a temperature of 0°C. A solution of 76.2 g. (0.96 mole) of pyridine and 49 g. (1.0 mole) of methyl mercaptan in 400 ml. of diethyl ether was added slowly to the flask containing phosphorous oxychloride over a 2-hour period of time, maintaining the temperature from 0° to 5°C. The mixture was then stirred for an additional 6 hours at temperatures of 0 to 10°C. After 18 hours of standing at 0°C. the crude reaction product was separated from the solid residue, stripped of solvent and purified to give 31.7 g of a liquid S,S-dimethylphosphorochloridodithioate.

The above S,S-dimethylphosphorochloridodithioate was then charged with 500 ml. of toluene to a 1 liter flask and ammonia gas added slowly at a temperature of 50° to 55°C. When the temperature started to drop, ammonia addition was stopped. The reaction was held at 50°C. for one-half hour and then cooled to room temperature and filtered. The filtrate was stripped of solvent under vacuum, then purified to give 6.6 g. of S,S-dimethylphosphoroamidodithioate. The compound had a melting point of 103°–105°C., and the following N, S, P analysis:

|     | Calculated | Found |
|-----|------------|-------|
| % N | 8.9        | 9.65  |
| % S | 41.0       | 38.1  |
| % P | 19.7       | 19.2  |

S,S-dimethylphosphoroamidodithioate was dissolved in 250 ml. dichloromethane and charged to a 500 ml. flask. 39.3 g. (0.5 mole) of acetylchloride was added. The solution was refluxed for 2 hours and stored at room temperature for 18 hours. The dichloromethane and excess acetylchloride were removed by evaporation and the product dissolved in 250 ml. of dichloromethane to which was added 250 ml. water containing sufficient calcium hydroxide to give a pH of 7 after thorough mixing. The organic phase was separated from the aqueous phase and the S,S-dimethyl-N-acetylphosphoroamidodithioate recovered from the organic phase as an oil (3.7 g.). Analysis was as follows:

|     | Calculated | Found |
|-----|------------|-------|
| % N | 7.03       | 6.48  |
| % S | 32.1       | 31.05 |
| % P | 15.52      | 14.08 |

Using the general procedures of Examples 1–5, other phosphoroamidothioates of this invention were prepared. These compounds and their analyses are tabulated below in Table I.

TABLE I

| Compound | M.P., °C. | Percent P Found | Percent P Calc. | Percent S Found | Percent S Calc. |
|---|---|---|---|---|---|
| O-ethyl-S-methyl-N-acetylphosphoroamidothioate | 67–75 | 15.35 | 15.70 | 16.95 | 16.24 |
| O-ethyl-S-propargyl-N-acetylphosphoroamidothioate | Oil | 14.05 | 13.81 | 15.58 | 14.85 |
| O-methyl-S-methyl-N-cyclohexanecarbonylphosphoroamidothioate | 95–100 | 12.33 | 12.18 | 12.76 | 13.40 |
| O-methyl-S-methyl-N-butyrylphosphoroamidothioate | Oil | 13.42 | 14.68 | 14.79 | 15.18 |
| O-methyl-S-methyl-N-propionylphosphoroamidothioate | Oil | 14.62 | 15.65 | 16.22 | 16.25 |
| O-methyl-S-methyl-N-isobutyrylphosphoroamidothioate | Oil | 12.10 | 14.68 | 13.65 | 15.18 |
| O-methyl-S-methyl-N-hexanoylphosphoroamidothioate | Oil | 12.48 | 12.95 | 11.88 | 13.42 |
| O-methyl-S-methyl-N-cyclopropanecarbonylphosphoroamidothioate | Oil | 13.75 | 14.8 | 14.82 | 15.3 |
| O-methyl-S-methyl-N-pivaloylphosphoroamidothioate | Oil | 11.90 | 13.76 | 13.68 | 14.25 |
| O-methyl-S-methyl-N-decanoylphosphoroamidothioate | Oil | 10.67 | 10.50 | 10.47 | 10.85 |
| O-methyl-S-methyl-N-acryloylphosphoroamidothioate | Oil | 15.99 | 15.85 | 18.20 | 16.42 |
| O-methyl-S-methyl-N-dichloroacetylphosphoroamidothioate | 129–132 | 12.60 | 12.28 | 13.27 | 12.71 |
| O-methyl-S-methyl-N-phenylacetylphosphoroamidothioate | Oil | 12.48 | 11.95 | 12.85 | 12.35 |
| O-methyl-S-methyl-N-cinnamoylphosphoroamidothioate | Oil | 11.42 | 11.42 | 11.93 | 11.82 |
| O-methyl-S-methyl-N-3,3-dimethylacryloylphosphoroamidothioate | 75–78 | 13.38 | 13.85 | 14.62 | 14.33 |
| O-methyl-S-methyl-N-crotonylphosphoroamidothioate | Oil |  |  | 13.82 | 15.32 |

Many of the N-acylphosphoroamidothioates of this invention are more selective in their insecticidal activity than their non-acylated analogs. Thus, a given compound may be highly active against one insect species and relatively inactive against another. The preferred compounds of this invention are especially effective against roaches, houseflies, cabbage loopers, aphids, bollworm, armyworms and corn earworms. Representative phosphoroamidothioates of this invention were tested as follows to illustrate the insecticidal properties of this grouping. Test results are reported in Table II.

TEST PROCEDURES

Cabbage looper (*Trichoplusia ni*): An acetone solution of the candidate toxicant containing a small amount of nonionic emulsifier was diluted with water to 250 ppm. Cabbage leaf sections were dipped in the toxicant solution and dried. The sections were then infested with cabbage looper larvae. Mortality readings were taken after 24 hours.

German Cockroach (*Blattella germanica L*): A 100 ppm acetone solution of the candidate toxicant was placed in a microsprayer (atomizer). A random mixture of anesthetized male and female roaches was placed in a container and 55 mg. of the above described acetone solution was sprayed on them. A lid was placed on the container. A mortality reading was made after 24 hours.

Two-spotted Mites (*Tetramuchus urticae*): An acetone solution of the candidate toxicant containing a small amount of nonionic emulsifier was diluted with water to 100 ppm. Pinto bean leaves which were infested with mites were dipped in the toxicant solution. Mortality readings were taken after 24 hours.

Aphids (*Aphis gossypii Glover*): An acetone solution of the candidate toxicant containing a small amount of nonionic emulsifier was diluted with water to 30 ppm. Cucumber leaves infested with the cotton aphids were dipped in the toxicant solution Mortality readings were then taken after 24 hours.

O-ethyl-S-propargyl-N-acetylphosphoroamidothioate gave 93 percent mortality in tests on houseflies at a concentration of 125 ppm. using the above-described method.

In tests carried out in the field, O-methyl-S-methyl-N-acetylphosphoroamidothioate showed excellent activity against the following insects:

| Insect | Crop |
| --- | --- |
| Pea aphid | alfalfa |
| Western yellow striped armyworm | alfalfa |
| Beet armyworm | alfalfa |
| Lygus hesperus | alfalfa |
| Citrus snow scale | citrus (grapefruit) |
| Diamondback larvae | collards |
| Bollworm | cotton |
| Beet armyworm | cotton |
| Green peach aphid | potatoes |
| Beet armyworm | sorghum |
| Beet armyworm | soybean |
| Corn earworm | corn |

As previously indicated the toxicological properties of the compounds of this invention are unexpectedly better than corresponding non-acylated compounds. This feature may be illustrated by comparing the toxicity index of a representative compound of this invention with that of its corresponding non-acylated analog. Toxicity index is a measure of a compound's safety relative to its insecticidal activity. It is defined here as:

$$LD_{90} \text{ insects (ppm)}/LD_{50} \text{ rats-oral (mg/Kg.)}$$

"$LD_{90}$ insects" is the least dosage that will provide 90 percent mortality of the test insect. It is determined by testing the toxicants at various concentrations by the above described testing and plotting the results. "$LD_{50}$ rats-oral" is the lowest dosage that will kill 50 percent of the test rodents in standard oral application tests. The toxicity indexes of O-methyl-S-methyl-N-acetylphosphoroamidothioate and its non-acylated analog O-methyl-S-methylphosphoroamidothioate, determined as above, are reported in Table III below. Also reported are the toxicity indexes of other O-methyl-S-methyl-N-acylphosphoroamidothioates.

TABLE II

| Compound | Percent mortality | | | | |
| --- | --- | --- | --- | --- | --- |
| | Cabbage looper | Cockroach | Housefly | Mites | Cotton aphids |
| O-methyl-S-methyl-N-acetylphosphoroamidothioate | 100 | a 100 | *100 | | |
| O-ethyl-S-methyl-N-acetylphosphoroamidothioate | 90 | a 100 | *100 | | |
| O-methyl-S-methyl-N-propionylphosphoroamidothioate | 90 | a 100 | 100 | 100 | 100 |
| O-methyl-S-methyl-N-butyrylphosphoroamidothioate | | **100 | **100 | 100 | |
| O,S-dimethyl-N-isobutyrylphosphoroamidothioate | | | **100 | 85 | |
| O,S-dimethyl-N-hexanoylphosphoroamidothioate | **100 | **100 | **100 | 99 | 85 |
| O,S-dimethyl-N-cyclopropanecarbonylphosphoroamidothioate | | | **100 | 99 | |
| O,S-dimethyl-N-pivaloylphosphoroamidothioate | | | | | 90 |
| O,S-dimethyl-N-decanoylphosphoroamidothioate | **100 | **100 | **100 | 100 | 100 |
| O,S-dimethyl-N-acryloylphosphoroamidothioate | **98 | **100 | **100 | 99 | 85 |
| O,S-dimethyl-N-dichloroacetylphosphoroamidothioate | | | 100 | 250 | 95 |
| S,S-dimethyl-N-acetylphosphoroamidodithioate | | | **100 | 97 | 98 | a German.   *100 p.p.m. concentration.   **500 p.p.m. concentration.

TABLE III

| Compound | LD₉₀ rats oral (mg./kg.) | LD₉₀ cabbage looper (p.p.m.) | LD₉₀ German roaches (p.p.m.) | LD₉₀ flies (p.p.m.) | LD₉₀ mites (p.p.m.) | LD₉₀ cotton aphids (p.p.m.) | Toxicity index×10² Cabbage looper | German roaches | Flies | Mites | Aphids |
|---|---|---|---|---|---|---|---|---|---|---|---|
| O-methyl-S-methyl-N-acetylphosphoroamidothioate | 700 | 100 | 20.5 | 21.5 | | | 14.3 | 2.9 | 3.1 | | |
| O-methyl-S-methyl-N-propionylphosphoroamidothioate | >1,000 | 180 | 85 | 27 | | | <18 | <8.5 | <2.7 | | |
| O-methyl-S-methyl-N-butyrylphosphoroamidothioate | 125 | | | 24.5 | | | | | 19.6 | | |
| O-methyl-S-methyl-N-isobutyrylphosphoroamidothioate | >500 | | | | 14.5 | 5.4 | | | | <2.9 | <1.1 |
| O-methyl-S-methylphosphoroamidothioate | 16 | 92 | 15.2 | ~10 | 9.5 | 7.5 | 575 | 95 | 62.5 | 50.3 | 47 |

In addition to the specific formulations and application techniques described above, one or more of the N-acylphosphoroamidothioates of this invention may be applied in other liquid or solid formulations to the insects, their environment or hosts susceptible to insect attach. For example, they may be sprayed or otherwise applied directly to plants or soil so as to effect control of insects coming into contact therewith.

Formulations of the compounds of this invention will comprise a toxic amount of one or more N-acylphosphoroamidothioate and a biologically inert carrier. Usually they will also contain a wetting agent. Solid carriers such as clay, talc, sawdust and the like may be used in such formulations. Liquid diluents which may be used with these compounds include water and aromatic solvents. In addition these formulations may contain other compatible pesticides, plant growth regulators, fillers, stabilizers, attractants and the like.

The term "insecticide" and "insect" as used herein refer to their broad and commonly understood usage rather than to those creatures which in the strict biological sense are classified as insects. Thus, the term "insect" is used not only to include small invertebrate animals belonging to the class *Insecta* but also to other related classes of arthropods whose members are segmented invertebrates having more or fewer than six legs, such as spiders, mites, ticks, centipedes, worms and the like.

As will be evident to those skilled in the art, various modifications on this invention can be made or followed, in the light of the foregoing disclosure and discussion, without departing from the spirit or scope of the disclosure or from the scope of the following claims.

I claim:

1. A compound of the formula

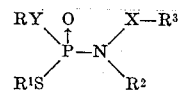

wherein
R is alkyl of one to three carbon atoms,
R¹ is an aliphatic hydrocarbyl radical of one to three carbon atoms,
R² is hydrogen or alkyl of one to three carbon atoms,
X is carbonyl,
Y is oxygen or sulfur,
R³ is hydrogen, alkyl of one to 18 carbon atoms, alkenyl of 2 to 18 carbon atoms, or alkynyl of three to 18 carbon atoms.

2. The compound of claim 1 wherein R² is hydrogen.

3. The compound of claim 2 wherein R¹ is alkyl or alkenyl, R³ is alkenyl and Y is oxygen.

4. The compound of claim 3 wherein R³ is vinyl.

5. The compound of claim 2 wherein R¹ is alkyl or alkenyl and R³ is alkyl.

6. The compound of claim 5 wherein Y is oxygen.

7. The compound of claim 6 wherein R³ is straight chain alkyl of one to 10 carbon atoms.

8. The compound of claim 7 wherein R and R¹ are methyl or ethyl.

9. The compound of claim 8 wherein R³ is methyl or ethyl.

10. The compound of claim 2 wherein R¹ is alkyl or alkenyl and R³ is hydrogen.

11. The compound of claim 10 wherein R and R¹ are methyl.

12. O-methyl-S-methyl N-acetyl phosphoroamidothioate.

* * * * *